(12) United States Patent
Song (10) Patent No.: US 9,036,637 B2
(45) Date of Patent: May 19, 2015

(54) MESSAGE TRANSMISSION IN VIRTUAL PRIVATE NETWORKS

(75) Inventor: Xiaoheng Song, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 102 days.

(21) Appl. No.: 13/530,883

(22) Filed: Jun. 22, 2012

(65) Prior Publication Data

US 2012/0327938 A1 Dec. 27, 2012

(30) Foreign Application Priority Data

Jun. 22, 2011 (CN) .......................... 2011 1 0171545

(51) Int. Cl.
*H04L 12/28* (2006.01)
*H04L 12/46* (2006.01)
*H04L 12/721* (2013.01)

(52) U.S. Cl.
CPC ............ *H04L 12/4633* (2013.01); *H04L 45/66* (2013.01)

(58) Field of Classification Search
CPC ....................................................... H04L 45/68
USPC .......................... 370/217, 225, 255, 392, 474
See application file for complete search history.

(56) References Cited

U.S. PATENT DOCUMENTS

| 7,710,993 | B1 * | 5/2010 | Burton et al. ................. 370/419 |
| 8,009,558 | B2 | 8/2011 | Ward et al. |
| 8,125,926 | B1 * | 2/2012 | Kompella ...................... 370/254 |
| 8,705,526 | B1 * | 4/2014 | Hasan ............................ 370/389 |
| 2004/0037279 | A1 * | 2/2004 | Zelig et al. ..................... 370/390 |
| 2006/0245436 | A1 * | 11/2006 | Sajassi ....................... 370/395.53 |
| 2008/0172497 | A1 * | 7/2008 | Mohan et al. .................. 709/249 |
| 2008/0253381 | A1 * | 10/2008 | Ward et al. ..................... 370/396 |
| 2008/0316972 | A1 | 12/2008 | Shaheen |
| 2010/0128728 | A1 * | 5/2010 | Sun et al. ....................... 370/392 |
| 2010/0135302 | A1 * | 6/2010 | Ra et al. ........................ 370/392 |
| 2010/0135307 | A1 * | 6/2010 | Nakagawa ................. 370/395.53 |
| 2011/0286462 | A1 * | 11/2011 | Kompella ................ 370/395.53 |
| 2013/0148657 | A1 * | 6/2013 | Salam et al. ................... 370/390 |

FOREIGN PATENT DOCUMENTS

| CN | 101262424 | 9/2008 |
| CN | 102075439 | 5/2011 |

OTHER PUBLICATIONS

CN First Office Action dated Jul. 4, 2012 issued on CN Patent Application No. 201110171545.5 filed on Jun. 22, 2011, The State Intellectual Property Office, P.R. China.

* cited by examiner

*Primary Examiner* — Nicholas Jensen
*Assistant Examiner* — Berhanu Belete
(74) *Attorney, Agent, or Firm* — Mannava & Kang, P.C.

(57) ABSTRACT

The disclosure relates to a method for transmitting a message in a Hierarchical Layer 2 Virtual Private Network (H-L2VPN). A destination MAC address, to which a message is to be forwarded upon receiving the message, is determined by a first peer node of the network. The first peer node determines whether one or more equivalent pseudo wires (PWs) connected thereto form a path to the destination MAC address. When it is determined that more than one equivalent PW forms a path to the destination MAC address, an arbitrary equivalent PW is selected from the more than one equivalent PW by the first peer node. The first peer node sends the message, via the selected equivalent PW, to a second peer node of the network connected to the selected equivalent PW for forwarding to the destination MAC address.

13 Claims, 7 Drawing Sheets

MESSAGE TRANSMISSION IN VIRTUAL PRIVATE NETWORKS

CLAIM FOR PRIORITY

The present application claims priority under 35 U.S.C 119 (a)-(d) to Chinese Patent application number 201110171545.5, filed on Jun. 22, 2011, which is incorporated by reference herein its entirety.

BACKGROUND

There are a number of ways to implement Layer 2 Virtual Private Networks (L2VPN), including Virtual Private LAN Service (VPLS), Provider Backbone Bridge (PBB), as well as dual-stack VPLS/PBB networks and so on.

In L2VPN, a Pseudo Wire (PW) is a virtual point-to-point connection over a communication network, which may be established between two Provider Edge devices (PE) by maintaining a Virtual Switching Instance (VSI).

In a Hierarchical Layer 2 Virtual Private Network (H-L2VPN), a main PW and a backup PW may be provided to a node to increase the reliability of connectivity via PW links. The main PW is used as the preferred forwarding path. When the main PW fails, traffic may be diverted to the backup PW to maintain the service.

DESCRIPTION OF THE DRAWINGS

For a more complete understanding of the present disclosure, specific examples will now be explained with reference to the accompanying drawings, in which.

DESCRIPTION

In VPLS, a data forwarding flow from a first Customer Edge device (CE) to a second CE may begin with a first User Provider Edge device (UPE) receiving a message sent by the first CE to be forwarded upstream to a first Network Provider Edge device (NPE). A Provider Edge device (PE) connects one or more CEs to the service provider network. An NPE functions as the network core PE while a UPE functions as the user access convergence device. A UPE and an NPE may, for instance, be a router, a hub or a switch, and a CE may be a router, a computer or a server, etc. Upon receiving the message from the first CE, the first UPE inserts a VPLS label corresponding to the first NPE, which is connected to the first UPE via a main PW.

After receiving the message, the first NPE determines, based on the VPLS label, the VSI to which the message belongs, then inserts a VPLS label corresponding to the next hop from the first NPE in accordance with the destination MAC address of the message. The first NPE then forwards the message on to the destination MAC address via a second NPE on the destination side.

At the destination side, when the second NPE receives the message from the source side (from the first NPE), the second NPE inserts a VPLS label corresponding to a second UPE that is connected to the second CE, and forwards the message to the second UPE. The second UPE in turn forwards the message to the second CE.

At any point of the data forwarding flow, if a failure occurs on a main PW, the VPLS control layer switches the traffic from the failed main PW to the backup PW, for instance, a link between the first UPE and another NPE on the source side connected to the first UPE via the backup PW.

In a PBB network having a statically configured MAC-in-MAC connection, main and backup PWs of PBB-type can also be implemented in a static manner. The control layer notifies the current main PW forwarding entries, so that any messages received on the backup PW link are discarded. In the case where CFM (Connectivity Fault Management) detection is used, connectivity detection is performed on the main PW link. When a main PW fails, the PBB control module switches the traffic from the failed main PW to the corresponding backup PW link.

Figure 1A:
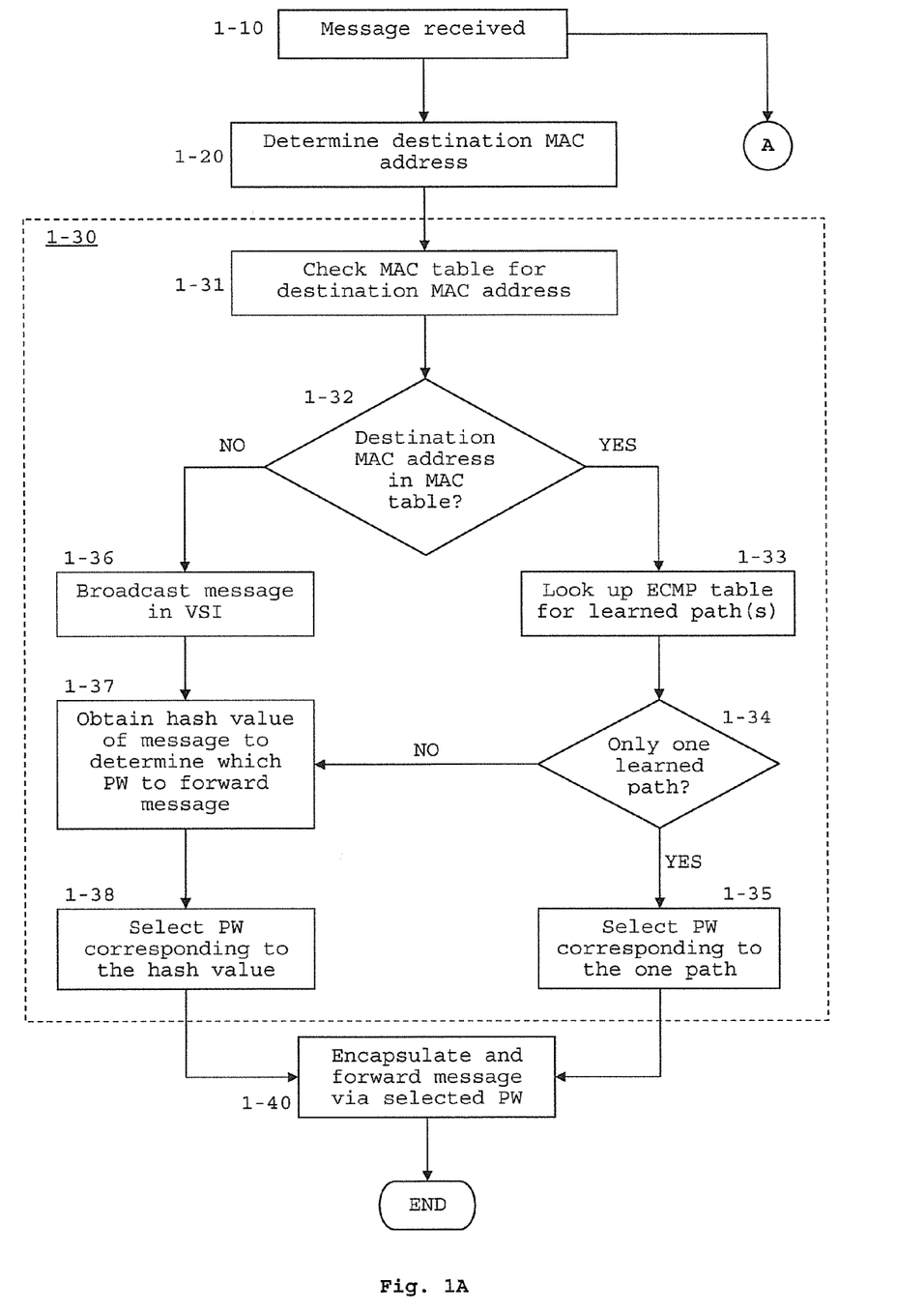
FIG. 1A is a flow diagram of an example of a method for transmitting a message by a peer node.

An example of a method of transmitting a message by a peer node in an L2VPN according to the present disclosure is shown in FIG. 1A. A peer node refers to a node that functions both as a client and a server to other nodes within the network, such as a UPE or an NPE. In this example, the L2VPN may include one or more interconnecting VPLS and/or PBB networks, and it is assumed that a VPLS or a PBB network comprises a first peer node and a plurality of second peer nodes, each second peer node is connected to the first peer node via a respective equivalent PW. Here, the term "equivalent PW" refers to the characteristic that all PWs connecting the first peer node to their respective second peer node within the same VPLS/PBB network are equivalent, in that there is no distinction between PWs of a main PW and a backup PW. In other words, all PWs connected to the first peer node may be selected for forwarding a message upstream (to the destination side).

At block 1-10, the first peer node receives a message. For example, in the case where the first peer node is a UPE, the message may be sent from a CE connected to the UPE.

Upon receiving the message, the first peer node determines the MAC address of the intended recipient of the message (destination MAC address) at block 1-20. In addition, the first peer node obtains the MAC address from which the message originates (source MAC address) in processing flow A to be discussed later.

The first peer node may maintain a MAC table for recording MAC addresses from which messages have been received before and routing information that have been learned for each recorded MAC address, and a broadcast table for recording routing information for one or more VSIs that corresponds to the or each VSI. The routing information of a MAC address may include one or more paths that connect the first peer node to the MAC address. Each path recorded against a particular MAC address begins with a hop from the first peer node to one of the second peer nodes via the respective equivalent PW, and subsequent hop or hops that leads eventually to the MAC address. In the case of more than one path recorded in the MAC table against the same MAC address, the first hop may involve the same or different equivalent PWs. The MAC table and the broadcast table may be maintained in a storage module within the first peer node, or externally in a separate unit managed by a separate management module.

In block 1-30, when the destination MAC address is determined, the first peer node determines whether there are one or more equivalent PWs connecting it to a second peer node forms a path connecting the first peer node to the destination MAC address, and accordingly selecting an equivalent PW for forwarding the message. In one example, there may be more than one candidate of equivalent PW if there are more than one path recorded against the destination MAC address in the MAC table. In another example, there may be more than one candidate of equivalent PW if the MAC table does not contain an entry that corresponds to the destination MAC address, and the message is to be broadcasted by the first peer node, in which case all equivalent PWs become candidate equivalent PWs.

In the present example, the determination by the first peer node whether there are more than one equivalent PW begins with the first peer node checking the MAC table, at block 1-31, for the destination MAC address.

At block 1-32, if the destination MAC address is present in the MAC table, the first peer node looks up, at block 1-33, the routing information that corresponds to the destination MAC address.

At block 1-34, if only one path is found in the MAC table recorded against the destination MAC address, the one path is selected at block 1-35 as the forwarding path of the message.

If, at block 1-34, more than one path is found in the MAC table recorded against the destination MAC address, the first peer node proceeds to block 1-37 to obtain a hash value of the message.

If the destination MAC address is not present in the MAC table at block 1-32, the first peer node determines that no routing information has been learned for the destination MAC address, and proceeds to broadcast the message in the VSI at block 1-36.

To broadcast the message, the first peer node looks up routing information in the broadcast table that corresponds to the current VSI and obtains a plurality of paths that can be used. Then, the first peer node proceeds to block 1-37 to obtain a hash value of the message.

In the case where a plurality of paths may be used, for example when a plurality of paths are recorded in the MAC table or when the message is to be broadcasted, the first peer node obtains a hash value of the message, and, at block 1-38, selects an equivalent PW that corresponds to the obtained hash value.

When an equivalent PW has been selected, either at block 1-35 or at block 1-38, the first peer node encapsulates the message according to the second peer node that is connect to the first peer node via the selected equivalent PW at block 1-40, and sends the message to the second peer node via the selected equivalent PW to be forwarded to the destination MAC address.

In the present example, when a plurality of equivalent PWs are available for forwarding the message, a PW is selected amongst the plurality of equivalent PWs on an arbitrary basis, for example by hashing the message, such that no one PW is considered to be the main PW. In this way, it is possible for multiple PWs to share load.

Figure 1B:
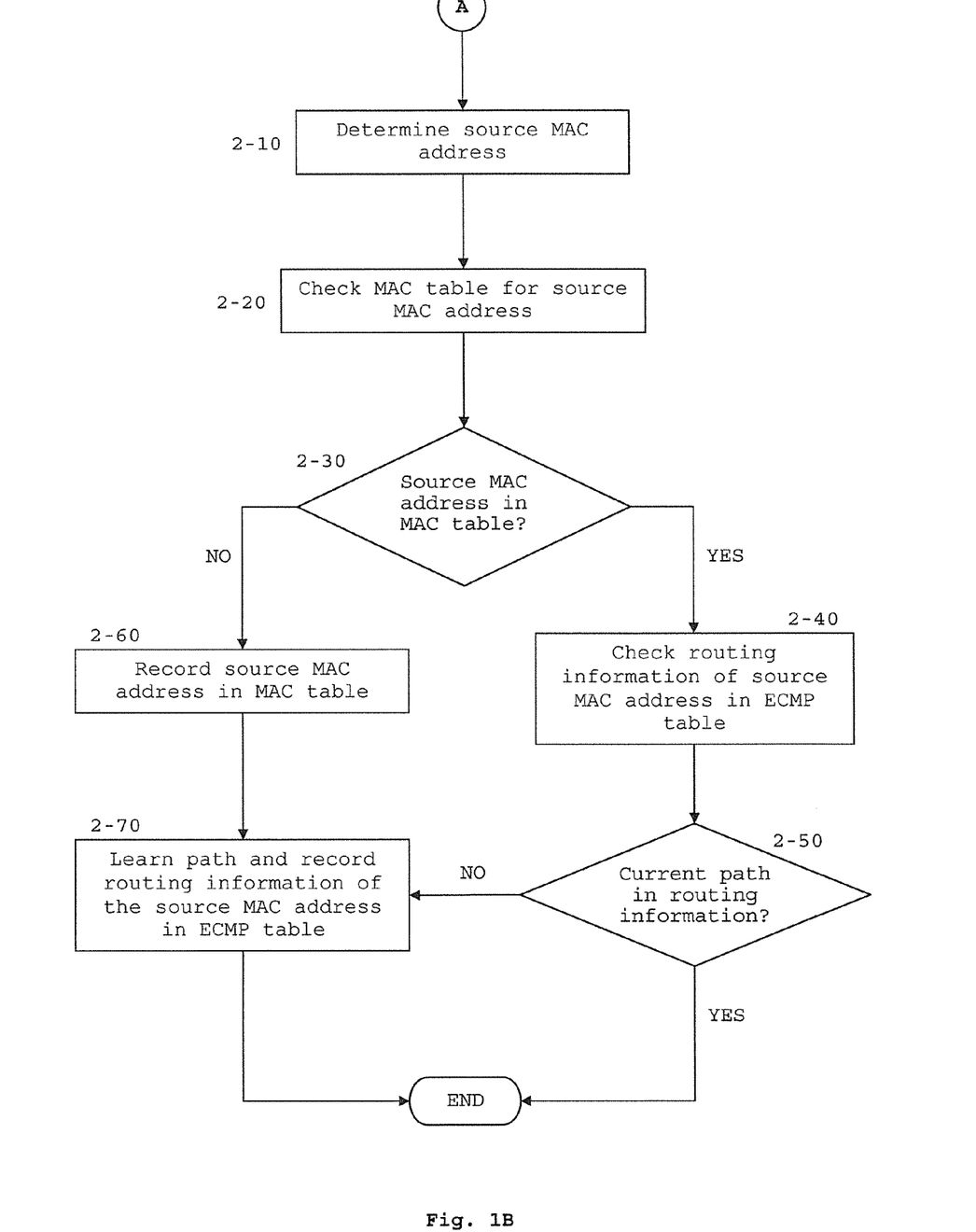
FIG. 1B is a flow diagram of an example of a method for source MAC address learning.

An example of a source MAC address learning method according to the present disclosure is shown in FIG. 1B. The method begins when a message is received by a peer node. In the example of FIG. 1A, when the first peer node receives the message at block 1-10.

Upon receiving the message, the first peer node obtains, at block 2-10, the source MAC address of the message, which is the MAC address from which the message is sent. The first peer node then check the MAC table, at block 2-20, for the obtained source MAC address.

At block 2-30, if it is found that the source MAC address is present in the MAC table, the first peer node checks, at block 2-40, the routing information corresponding to the source MAC address. If it is found at block 2-50 that the path along which the current message is received has already been recorded as routing information for the source MAC address in the MAC table, the MAC address learning process ends.

If it is found at block 2-30 that the source MAC address is not present in the MAC table, the first peer node records, at block 2-60, the source MAC address in the MAC table. In this case, and in the case where the first peer node determines at block 2-50 that the path along which the current message is received has not been recorded, the first peer nodes learns the current path and records the path as routing information corresponding to the source MAC address at block 2-70.

In the present example, when the first peer node receives a message via a new path, i.e. a path that is not included in the routing information corresponding to the source MAC address, the new path is learned and recorded as part of the routing information for the source MAC address. In this way, it is possible for a peer node to record multiple paths so that a path may be selected from amongst the multiple paths on an arbitrary basis.

Figure 2:
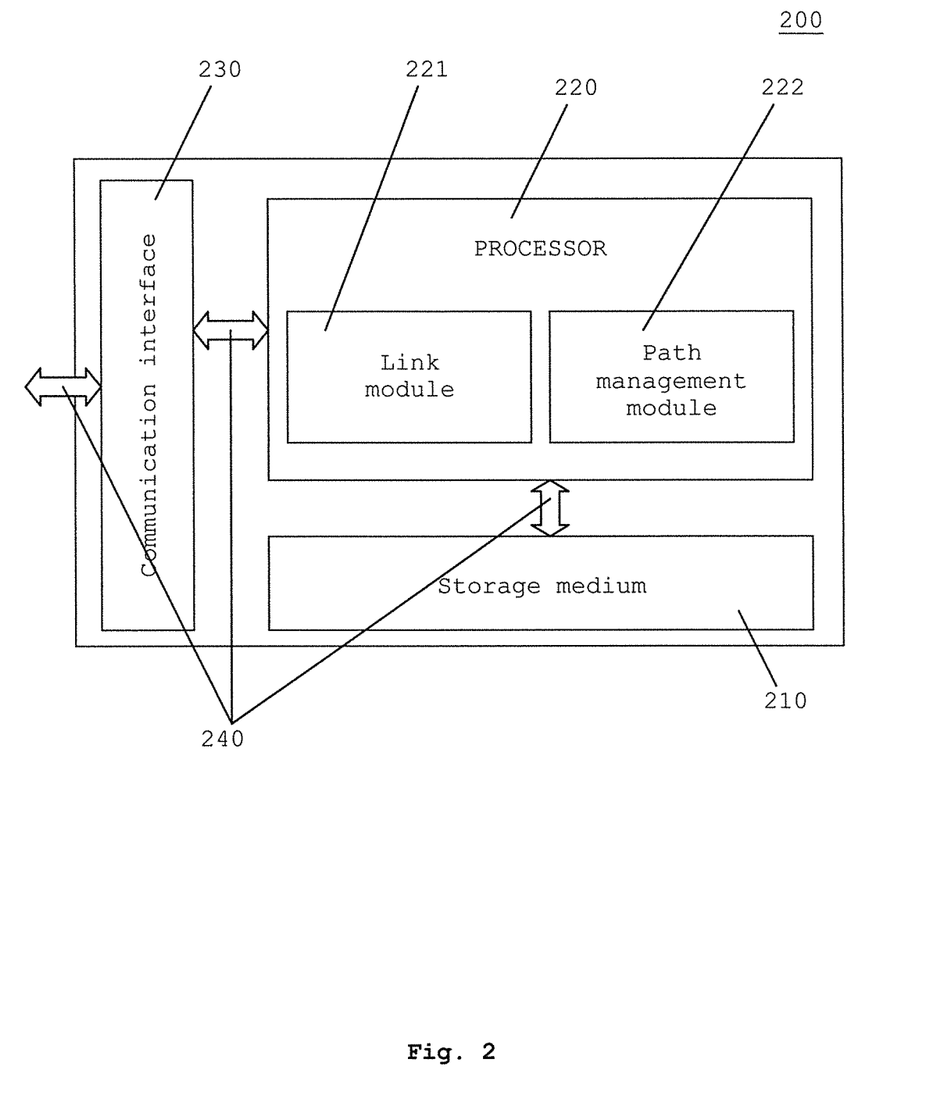
FIG. 2 is a schematic of an example of a network device.

FIG. 2 is a schematic of a network device which may be used as a peer node in an L2VPN as described in the example above. The network device 200 comprises a storage medium 210, a processor 220, a communication interface 330 and coupling mechanism 240 that couples the storage medium 210, the processor and the communication interface 330. The processor 220 comprises a link module 221 and a path management module 222. In the present example, the storage medium 210 is used for storing one or more MAC tables and broadcast tables corresponding to various VSIs. The processor 220 is used for forwarding data flow. The communication interface 330 is used for sending and receiving data flow.

In the memory 210, each MAC table records one or more MAC addresses with corresponding routing information learned for the one more MAC addresses. Each MAC table may include multiple table entries, each table entries recording a MAC address and the routing information learned for the MAC address. In a MAC table, if a table entry records a source MAC address that was learned over an access circuit, the table entry may include the source MAC address and an identifier of the access circuit. If a table entry records a source MAC address that was learned over an equivalent PW belonging to an Equal-Cost Multi-path (ECMP) routing group, the table entry may include the source MAC address, an identifier of the ECMP group (ECMP-ID) and the respective identifier for one or more equivalent PW (PW-ID). PWs belonging to the same ECMP routing group are equal, or equivalent, in that, with respect to a peer node, the next hop from the peer node may be performed over any one of the PWs in the group. An identifier of an access circuit may be a port index of the access circuit, an identifier of an equivalent PW may be an egress index of the equivalent PW.

In other examples, the table entries of a MAC table may include other contents besides MAC addresses and corresponding routing information, depending on the implementation requirements for forwarding messages.

In the present example, the path management module 222 records learned MAC addresses and corresponding routing information in the MAC table, the routing information with respect to a learned MAC address includes one or more ECMP-IDs, one or more PW-IDs, and the number of equivalent PWs learned for the MAC address (for example, "1" when one equivalent PW has been learned for the MAC address). When the path management module 222 learn the same MAC address from an equivalent PW that has not been recorded previously, the path management module 222 records in the routing information of the learned MAC address the PW-ID of the new equivalent PW and updates the number of equivalent PWs to 2.

In particular, the path management module 222 records the forwarding information and the connectivity information for one or more PWs in the routing information of a learned MAC address. The path management module 222 records ECMP-IDs, PW-IDs and the number of equivalent PW as the forwarding information for each learned MAC address, and uses the forwarding information of a learned MAC address to select an equivalent PW in order to forward a message to the learned MAC address. The path management module 222 updates the connectivity information of the learned MAC address in accordance with the forwarding information of the learned MAC address, in order to examine the connection status with respect to a source MAC address.

Based on the forwarding information of a learned MAC address, the path management module 222 determines if the present path of the learned MAC address is the same as the previously recorded paths of the learned MAC address. If the path management module 222 determines that the current path connecting to the learned MAC address is an access circuit, the path management module 222 records the identifier of the access circuit in the routing information of the learned MAC address. If the path management module 222 determines that the current path connecting to the learned MAC address is an equivalent PW having the same ECMP-ID but different PW-ID to an equivalent PW previously recorded with respect to the learned MAC address, the path management module 222 records in the forwarding information in the routing information of the learned MAC address the PW-ID of the current equivalent PW, and updates the number of equivalent PW for the learned MAC address, and according to the updated forwarding information updates the connectivity information in the routing information of the learned MAC address. If the path management module 222 determines that the current path connecting to the learned MAC address is an equivalent PW that has already been recorded, then no change is made in the forwarding information.

In the storage medium 210, a broadcast table records for a corresponding VSI the routing information of all access circuits and the routing information of all equivalent PWs of the corresponding VSI. A broadcast table may include more than one access circuit table entry and more than one equivalent PW table entry. In particular, a table entry of an access circuit records the routing information of a direct link to a CE, such as a port index of an access circuit. A table entry of an ECMP routing group records the routing information of all of the equivalent PWs of the ECMP routing group in a corresponding VSI, such as the egress port index of each equivalent PW and the number of equivalent PWs in the ECMP routing group.

The link module 221 is used for establishing a PW from the network device 200. For example, in the case where the network device 200 functions as the first peer node as described with reference to FIGS. 1 and 2, the link module 221 establishes an equivalent PW connecting the first peer node to the respective second peer node.

Upon receiving, through the communication interface 330, an encapsulated message containing the forwarding tunnel identifier of the message via an equivalent PW, the path management module 222 de-encapsulate the message to obtain the forwarding tunnel identifier, and search for any routing information recorded for the source MAC address of the message in the MAC table corresponding to the current VSI in the storage module 310.

If no learned address recorded in the MAC table correspond to the source MAC address of the message, or if the current path to the source MAC address is different from the path recorded in the MAC table, the path management module 222 learns the source MAC address and corresponding routing information as described with reference to FIG. 1B. In the case where the routing information of the source MAC address in the MAC table includes an identifier of an access circuit, the path management module 222 deletes the identifier of the access circuit from the routing information of the source MAC address, and records for the current path to the source MAC address the ECMP-ID and the PW-ID.

The path management module 222 obtains the MAC address to which the message is to be sent (destination MAC address) and searches in the MAC table for the destination MAC address and the corresponding routing information. If the routing information of the destination MAC address includes an identifier of an access circuit, the network device 200 forwards the message to the CE at the destination MAC address via the access circuit identified by the identifier recorded in the routing information. On the other hand, if the MAC table does not contain any routing information for the destination MAC address, the network device 200 broadcasts the message to all CEs according to the broadcast table in the storage medium 210 corresponding to the current VSI.

Upon receiving, through the communication interface 330, a message sent from a CE via an access circuit, the path management module 222 searches in the MAC table that corresponds to the current VSI for the MAC address from which the message is sent (source MAC address). If the source MAC address is present in the MAC table and the corresponding routing information already includes the identifier of the access circuit, the path management module 222 does not update the routing information of the learned source MAC address in the MAC table. If no routing information of the source MAC address is found in the MAC table, the path management module 222 records the identifier of the access circuit in the MAC table. If the routing information of the source MAC address includes the identifier of another access circuit, the path management module 222 deletes the previously recorded identifier of the another access circuit, and records in the routing information the identifier of the current access circuit.

If the routing information of the destination MAC address is not recorded in the MAC table, the path management module 222 broadcast the message via one of the equivalent PWs of the ECMP routing group according to the broadcast table corresponding to the current VSI as well as all access circuits connected to the network device 200 other than the access circuit along which the message was received. In particular, the path management module 222 obtains a first hash value using the message header and the number of equivalent PW in the EMCP routing group, determine which of the equivalent PWs within the ECMP routing group corresponds to the obtained first hash value, and according to the determined equivalent PW encapsulate the message and forward the encapsulated message via the determined equivalent PW. If the destination MAC address is a learned MAC address recorded in the MAC table, and the corresponding routing information includes the identifier of more than one equivalent PW having the same ECMP-ID, the path management module 222 obtains a second hash value using the message header and the number of equivalent PWs with the same ECMP-ID, identify the equivalent PW that corresponds to the obtained second hash value, encapsulate the message according to the identified equivalent PW and forward the encapsulated message via the identified equivalent PW.

The field of a message header used by the path management module 222 to compute the first hash value may be the same as, or may be different from, that which is used to compute the second hash value. The field or fields may include, but not limited to, SMAC (source MAC) of the message header, DMAC (destination MAC), S-TAG and C-TAG.

The link module 221 monitors the connectivity of each PW connected to the network device 200 and report to the path management module 222 if a failed PW is detected. The link module 221 may monitor PW connectivity through the use of BFD (Bidirectional Forwarding Detection) protocol messages, Ethernet OAM (Operation, Administration and Maintenance) protocol messages and CFA (Connectivity, Fault Detection) protocol messages.

The path management module 222 revises the broadcast tables and the MAC tables in the storage medium 310 according to the failed PWs reported by the link module 221. When a failed equivalent PW is reported to the path management module 222, it deletes, from the routing information of the broadcast table that corresponds to the VSI of the failed equivalent PW, the path or paths that include the failed equivalent PW. If the number of equivalent PWs is recorded in the broadcast table, the path management module 222 further updates the number of equivalent PWs, for example reducing the number by 1. Moreover, the path management module 222 checks the MAC tables stored in the storage medium 210 for table entries that include the failed equivalent PW. If a MAC address entry of a is found to include only the ECMP-ID and PW-ID of the failed equivalent PW, the path management module 222 deletes the table entry from the MAC table. If a MAC address entry is found to include the ECMP-ID and PW-ID of the failed equivalent PW as well as the PW-ID of other equivalent PWs, the path management module 222 deletes the PW-ID of the failed equivalent PW from the MAC table. If forwarding information and connectivity information are also recorded in the MAC table, the path management module 222 further deletes from the MAC table the forwarding information of the failed equivalent PW, reduces the number of equivalent PW by 1, and updates the connectivity information according to the revised forwarding information.

In the example, the network device 200 may be used in a VPLS network as a UPE, or in a PBB network as a BEB (Backbone Edge Bridge) directly connecting to a CE, or in a dual-stack VPLS/PBB network as either a UPE or a BEB.

In the following, a number of examples of different network architecture will be explained so as to illustrate, by examples only, the processing by the network device 200 described above with reference to FIG. 2 to forward a message in a L2VPN.

Figure 3:
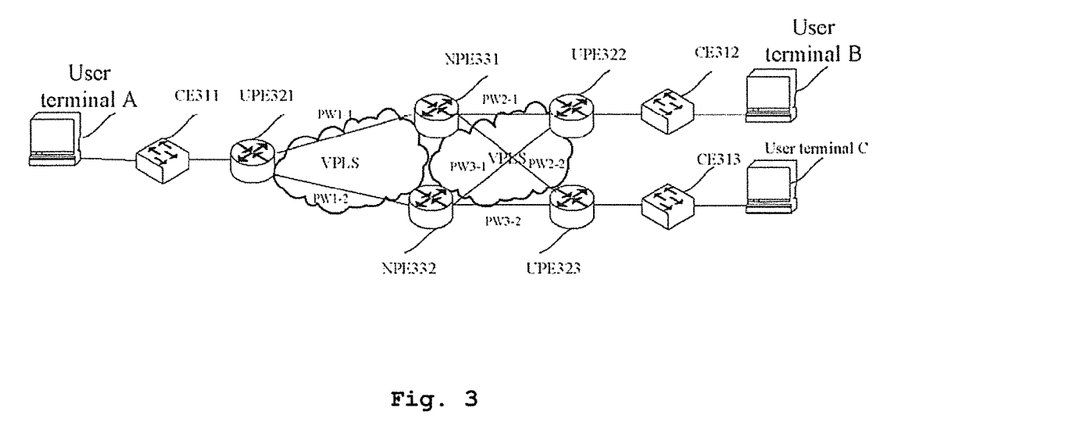
FIG. 3 is an example of a configuration of a VPLS network.

FIG. 3 is a schematic drawing showing an implementation example of a VPN architecture. In the hierarchical VPLS network architecture 300 of FIG. 3, devices UPE321, UPE322 and UPE323 may be implemented using the network device 200. In the example, user terminal A is connected to UPE321 via a connection with CE311, user terminal B and user terminal C are respectively connected to UPE322 and UPE323 via CE312 and CE313.

Since the message forwarding process of UPE321, UPE322 and UPE323 are the same in this example, only the process performed by UPE321 will be described as an example below.

At UPE321, two equivalent PWs are established under the current VSI connecting to NPE331 and NPE332. When the status of both of the two equivalent PW is UP, the two equivalent PW are each assigned the same ECMP-ID, ECMP 1, and the same PW-ID, PW 1, thus UPE321 connects to NPE331 and NPE332 through two equivalent PW of the same ECMP routing group. UPE321 assigns different IN labels, V-Label1 and V-Label2, respectively to NPE331 and NPE332, and obtains respectively from NPE331 and NPE332 assignment of different OUT labels, V-Label3 and V-Label4.

Similarly, at UPE322, two equivalent PWs are established under the same VSI connecting to NPE331 and NPE332. When the status of both of the two equivalent PW is UP, the two equivalent PW are each assigned the same to the ECMP routing group with the ECMP-ID ECMP 2, and the same PW-ID, PW 2, thus UPE322 connects to NPE331 and NPE332 through two equivalent PW of the same ECMP routing group. UPE322 assigns different IN labels respectively to NPE331 and NPE332, and obtains respectively from NPE331 and NPE332 assignment of different OUT labels.

Similarly, two equivalent PWs are established under the same VSI connecting UPE323 to NPE331 and NPE332. When the status of both of the two equivalent PW is UP, the two equivalent PW are each assigned the same to the ECMP routing group with the ECMP-ID ECMP 3, and the same PW-ID, PW 3, thus UPE323 connects to NPE331 and NPE332 through two equivalent PW of the same ECMP routing group. UPE323 assigns different IN labels respectively to NPE331 and NPE332, and obtains respectively from NPE331 and NPE332 assignment of different OUT label.

Since the equivalent PWs have the same PW-ID, in order to more clearly illustrate the present example, in the following, as shown in FIG. 3, the PW-IDs, PW1-2 and PW1-1, will be used to represent the two equivalent PWs of UPE321, the PW-IDs, PW2-1 and P2-2, will be used to represent the two equivalent PWs of UPE322, and the PW-IDs, PW3-1 and PW3-2, will be used to represent the two equivalent PWs of UPE333.

In the following, user terminal A sends a message to user terminal B, the message forwarding process according to the present example involves the user terminal A sending the message to CE311, and CE311 forwards the message by way of unicast or broadcast to UPE321.

When UPE321 receives the message via the access circuit (AC) connecting it to CE311, the source MAC address, MAC-A, of the user terminal A is not found in the MAC table corresponding to the current VSI, UPE321 therefore creates a new table entry for recording the source MAC address MAC-A as well as the port number, AC1, in the AC in the MAC table. UPE321 also searches for the destination MAC address of the message, MAC-B, in the MAC table of the current VSI. If the destination MAC address is not found, UPE321 then selects access circuits other than AC1 (not shown in FIG. 3) from the broadcast table of the current VSI and broadcasts the message via the selected ACs. In addition, UPE321 computes the first hash value using an ECMP routing algorithm, the first hash value thus obtains corresponds, for example, to PW1-1 amongst the two equivalent PWs recorded in the broadcast table. Accordingly, UPE321 encapsulates the message according to the assigned label V-Label3 for connecting to NPE331 via the equivalent PW PW1-1, and forward the encapsulated message to NPE331 via PW1-1.

Upon receiving the encapsulated message, NPE331 removes the label V-Label3 and searches for the destination MAC address MAC-B in the MAC table. If MAC-B is not present in the MAC table, NPE331 encapsulates the message according to the assigned label for connecting to UPE322 via PW2-1, and the assigned label for connecting to UPE323 via PW2-2, and forwards the two encapsulated messages to UPE 322 and UPE 323 respectively via the equivalent PWs PW2-1 and PW2-2.

The learning of the source MAC address by NPE331, the unicasting of a message via an equivalent PW recorded with a learned destination MAC address and the broadcasting of a message via an equivalent PW are the same as in a UPE, and a description of these processes will not be duplicated here.

Upon receiving the encapsulated message, UPE322 de-encapsulate the message and searches for the source MAC address MAC-A in the MAC table corresponding to the current VSI. When MAC-A is not found, UPE322 records MAC-A in the MAC table and learns the routing information of MAC-A. The routing information may include, for example, the ECMP routing group ID ECMP 2, the equivalent PW ID PW2-1, as well as updating the number of equivalent PW for the MAC address MAC-A to 1. In the case where UPE322 searches for the destination MAC address MAC-B in the MAC table and MAC-B is not found, UPE322 selects all ACs from the broadcast table in the current VSI broadcast table and broadcasts the de-encapsulated message to all CEs via the selected ACs. Thereafter, CE312 forwards the de-encapsulated message either by way of unicast or broadcast to the user terminal B.

The processes performed by UPE323 upon receiving the encapsulated message is essentially the same as the processes performed by UPE322 as described above, and therefore a description thereof will not be duplicated here.

UPE321, UPE322 and UPE323 examine the connectivity of the two equivalent PWs respectively to the peer nodes NPE332 and NPE331 by sending BFD messages.

If UPE321 detects that the connection via the equivalent PW PW1-1 is broken, UPE321 checks all the entries in the MAC table that corresponds to the current VSI. If none of the learned MAC addresses recorded in the MAC table includes the equivalent PW PW1-1, UPE321 deletes the port index of the PW1-1 from the ECMP routing group in the broadcast table of the current VSI, and updates the number of equivalent PW in the ECMP routing group to 1.

If UPE322 detects that the connection via the equivalent PW PW2-1 is broken, UPE322 checks all the entries in the MAC table that corresponds to the current VSI. If the routing information of a MAC address, for instance MAC-A, includes the ECMP-ID ECMP 2 and the port index of the equivalent PW PW2-1, UPE322 deletes the table entry of MAC-A from the MAC table, and deletes the port index of the equivalent PW PW2-1 from the broadcast table of the current VSI, and updates the number of equivalent PW in the ECMP routing group to 1.

When the user terminal A sends another message to the user terminal B, the forward process is as follows:

When UPE321 receives the message via AC1, it determines from the MAC table corresponding to the current VSI that the AC1 learned for MAC-A is the same as the AC1 from which the message arrives. UPE321 searches but cannot find the destination MAC address MAC-B in the MAC table. UPE321 then encapsulates the message using the assigned label V-Label4 for connecting to NPE332 via PW1-2, and forward the encapsulated message to NPE332 via PW1-2.

Upon receiving the encapsulated message, NPE332 removes the label V-Label4, searches and cannot find the destination MAC address MAC-B in the MAC table, and in response broadcasts the message via PWs other than the PW at which the message was received. NPE332 encapsulates the message according to the assigned label for connecting to UPE322 via PW2-2 and the assigned label for connecting to UPE323 via PW3-2, and forwards the encapsulated messages respectively via PW2-2 and PW3-2 to UPE322 and UPE323.

UPE322 de-encapsulates the message upon receiving it and searches the MAC table. When it is found that the routing information of MAC-A includes the ECMP-ID ECMP 2, the port index of PW2-1 and the number of equivalent PW is 1, UPE322 adds the port index of PW2-2 in the routing information of MAC-A, and updates the number of equivalent PWs to 2. When it is found that the MAC address MAC-B is not in the MAC table, UPE322 selects all ACs in the broadcast table corresponding to the current VSI and broadcast the message to all CEs via the selected ACs. CE312 then forwards the de-encapsulated message by way of unicast or broadcast to the user terminal B.

When UPE323 receives the encapsulated message, the processes performed by UPE323 is essentially the same as the processing performed by the UPE 322 as described above. In particular, UPE323 de-encapsulates the received message, searches the MAC table that corresponds to the current VSI and finds that the routing information of MAC-A includes ECMP3, the port index of PW3-1 and the number of equivalent PW is 1. UPE323 then additionally includes in the routing information of the learned MAC-A the port index of PW3-2 and increases the number of equivalent PW to 2.

UPE321, UPE322 and UPE323 examines the connectivity to the peer nodes NPE332 and NPE331 via the respective two equivalent PWs by sending BED messages.

Upon detecting that the connection via PW2-1 is broken, UPE322 checks all the entries in the MAC table. When it is found that the routing information of MAC-A includes the OUT indices of PW2-1 and PW2-2, UPE322 deletes from the routing information of MAC-A the port index of PW2-1, and updates the number of equivalent PWs to 1.

The following describes the processes performed when the user terminal B sends a message to the user terminal A:

The message is sent from the user terminal B to UPE322 via CE312. If UPE322 after searching for the source MAC address MAC-B in the MAC table corresponding to the current VSI cannot find MAC-B, UPE322 records MAC-B in the MAC table and learns the routing information of MAC-B, including the access circuit port number (AC2) at which the message was received. UPE322 searches in the MAC table and finds the destination MAC address MAC-A and routing information corresponding to ECMP 2, the OUT indices of PW2-1 and PW2-2 and the number of equivalent PWs is 2. UPE322 computes a second hash value according to the message header and the number of equivalent PWs, obtains a second hash value that corresponds to the port index of the equivalent PW PW2-1, encapsulates the message according to the assigned label for connecting to NPE331, and send the encapsulated message to NPE331 via PW2-1.

NPE331 removes the message label, and searches for the source MAC address MAC-B in the corresponding MAC table of the VSI. When it is found that MAC-B is not in the MAC table, NPE331 records MAC-B and the port index of PW2-1 in the MAC table. NPE331 searches and finds the routing information of the destination MAC address MAC-A which includes the port index of PW1-1 the MAC table. NPE331 then encapsulates the message according to the assigned label V-Label1 for connecting to UPE321 and sends the encapsulated message to UPE321 via PW1-1.

UPE321 removes the label V-Label1 upon receiving the message, searches the MAC table for the source MAC address MAC-B, records MAC-B and the corresponding routing information of MAC-B in the MAC table when MAC-B cannot be found in the MAC table. The routing information may include ECMP 1 and the port index of PW1-

1. UPE321 searches for the destination MAC address MAC-A in the MAC table and finds the connection AC1, then forwards the de-encapsulated message to CE311 via AC1. CE311 then forward the message to the user terminal A.

When the user terminal B sends another message to the user terminal A, the message forwarding process is as follows:

The message is sent by the user terminal B to UPE322 through CE312. UPE322 searches in the MAC table for the source MAC address MAC-B, finds the connection AC2 and determines that the current message similarly arrives via AC2. UPE322 searches for the destination MAC address MAC-A in the MAC table and finds in the corresponding routing information the ECMP-ID of ECMP 2, and the OUT indices of PW2-1 and PW2-2. UPE322 then computes a second hash value from the message header which corresponds to the port index of the PW2-2, encapsulates the message according to the assigned label for connecting to NPE332, and forwards the encapsulate message to NPE332 via the PW2-2.

It should be noted that, although the message header of a message sent from the user terminal B to the user terminal A may be the same, the attribute value of the message header may not necessarily be the same. Thus, a hash value computed using a message header use for determining the selection of an equivalent PW also may not be the same.

NPE332 removes the message label, searches the MAC table and cannot find the source MAC address MAC-B, thus records MAC-B and the corresponding routing information of MAC-B in the MAC table, including the port index of PW2-2. NPE332 then searches for the destination MAC address MAC-A and finds that the corresponding routing information includes the port index of PW1-2. NPE332 encapsulates the message according to the assigned label V-Label2 for connecting to UPE321, and sends the encapsulated message to UPE321 via the PW1-2.

When the encapsulated message is received via PW1-2, UPE321 removes the message label V-Label2, searches for the source MAC address MAC-B in the MAC table and finds the routing information includes ECMP 1 and the port index of PW1-1, thus in the routing information of MAC-B further includes the port index of PW1-2, and updates the number of equivalent PWs to 2. UPE321 then searches for the destination MAC address MAC-A in the MAC table and finds the connection AC1 in the MAC table, and forwards the de-encapsulated message to CE311 via AC1. CE311 then forwards the message to the user terminal A.

The message forwarding process between the user terminal A and the user terminal C is essentially the same as the message forwarding process between the user terminal A and the user terminal B as described above.

Figure 4:
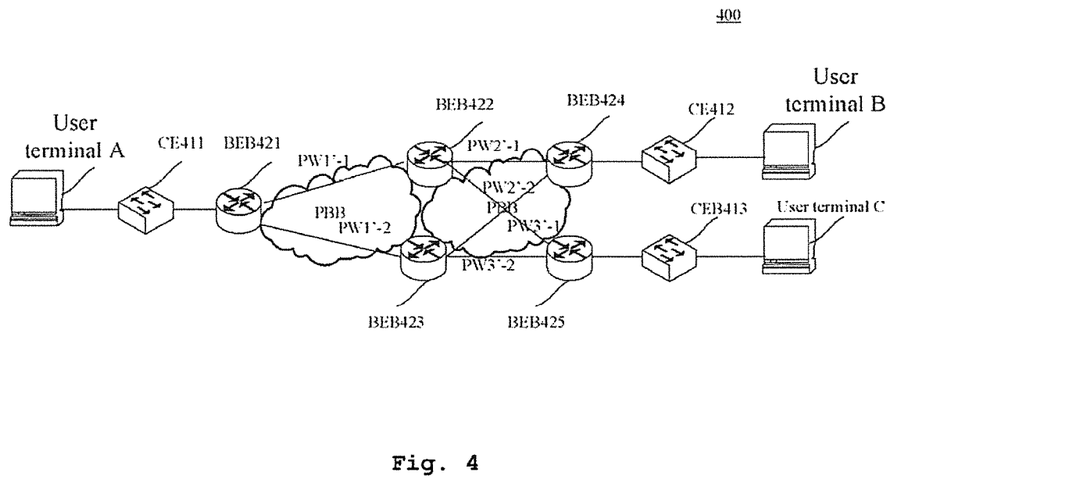
FIG. 4 is an example of a configuration of a PBB network.

FIG. 4 is a schematic drawing showing an implementation example of a VPN architecture. In the PBB network architecture 400 of FIG. 4, the devices BEB421, BEB424 and BEB425 directly connecting to the respective CEs via an access circuit (AC) may be implemented using the network device 200 as described above with reference to FIG. 2. User terminal A connects to BEB421 through CE411. User terminal B and user terminal C respectively connecting to BEB424 and BEB425 through CE412 and CE413.

BEB421 establishes PW with BEB422 and BEB423. When the status of the two PWs is UP, the two PWs are assigned the same ECMP-ID, ECMP 1', such that the two PWs belong to the same ECMP routing group. Moreover, BEB421 assigns the same PW-ID to both equivalent PWs, for instance, PW1'.

BEB424 establishes PW with BEB422 and BEB423. When the status of the two PWs is UP, the two PWs are assigned the same ECMP-ID, ECMP 2', such that the two PWs belong to the same ECMP routing group. Moreover, BEB424 assigns the same PW-ID to both equivalent PWs, for instance, PW 2'.

BEB425 establishes PW with BEB422 and BEB423. When the status of the two PWs is UP, the two PWs are assigned the same ECMP-ID, ECMP 3', such that the two PWs belong to the same ECMP routing group. Moreover, BEB425 assigns the same PW-ID to both equivalent PWs, for instance, PW3'.

Since the equivalent PWs have the same PW-ID, in order to more clearly illustrate the present example, in the following the reference, as shown in FIG. 4, PW1'-1 and PW1'-2 are used to differentiate the two equivalent PWs established by BEB421, the reference PW2'-1 and PW2'-2 are used to differentiate the two equivalent PWs established by BEB424, and the reference PW3'-1 and PW3'-2 are used to differentiate the two equivalent PWs established by BEB425.

An example of a message forwarding process in which the user terminal A sends a message to the user terminal B is described below.

User terminal A transmits the message to CE411, and CE411 forwards the message by way of unicast or broadcast to BEB421.

Upon receiving a message from CE411 through the connecting access circuit (AC1'), BEB421 searches for the source MAC address MAC-A in the corresponding MAC table of the current VSI. When MAC-A is not found in the MAC table, BEB421 creates a new table entry for MAC-A and records the routing information of MAC-A in the MAC table. The routing information may include the port number of the AC AC1'. BEB421 then searches for and cannot find the destination MAC address MAC-B in the MAC table, and selects all ACs from the broadcast table of the current PBB instance other than AC1' for broadcasting the message, and according to a predetermined ECMP routing algorithm computes a first hash value. Amongst the two equivalent PWs recorded in the broadcast table, if the port index of PW1'-1 corresponds to the obtained first hash value, using the MAC address of BEB422 connected via the PW1'-1 as the outer layer destination MAC address, the MAC address of BEB421 as the outer layer source MAC address, BEB421 encapsulates the message in a MAC-in-MAC message header, and sends the encapsulated message via the PW1'-1 to BEB422.

Upon receiving the encapsulated message, BEB422 removes the MAC-in-MAC message header, searches for and cannot find the source MAC address MAC-A in the corresponding MAC table of the current PBB instance, and in response records MAC-A and the corresponding routing information of MAC-A in the MAC table, including the PW-ID PW1'-1. BEB422 searches for the destination MAC address MAC-B in the MAC table, and, when MAC-B is not found, broadcasts the message on all PW recorded in the broadcast table other than the PW on which the message was received. In particular, BEB422 uses the MAC address of BEB424 connected via PW2'-1 as the outer layer destination MAC address, the MAC address of BEB422 as the outer layer source MAC address, to encapsulate the message in a MAC-in-MAC message header, then forwards the encapsulated message through PW2'-1 retransmits BEB424; As well as BEB422 PW3'-1 connection the equipment MAC address of BEB425 takes the outer layer goal MAC address, the MAC address of this equipment takes the outer layer source MAC address, encapsulates the MAC-in-MAC message head for the message, and forwards the encapsulated message via PW3'-1 to BEB425. Source MAC address learning by BEB422 and BEB423, and the unicasting of a message on PW to a destination MAC address are similar to the processes described above for a VPLS network.

Upon receiving the message, BEB424 removes the MAC-in-MAC message header, and searches for the source MAC address MAC-A in the corresponding MAC table of the current PBB instance. If MAC-A is not found in the MAC table, BEB424 records the MAC address MAC-A and the corresponding routing information in the MAC table, including the ECMP-ID, ECMP 2', and the port index of PW2'-1. BEB424 searches for the destination MAC address MAC-B in the MAC table, and when MAC-B is not found, BEB424 selects all ACs in the broadcast table of the current PBB instance and all equivalent PWs having PW-IDs other than the PW-ID of the equivalent PW from which the message was received. CE412 through AC AC2' receives the message from BEB424, and forwards the message by way of unicast or broadcast to the user terminal B.

In the example of FIG. 4, BEB424 establishes under the current PBB instance two equivalent PWs having the same PW-ID, through searching for PWs having different PW-ID, re-sending of the message to BEB421 again via an equivalent PW with the same PW-ID is avoided. BEB421 may determine the PW-ID of an equivalent PW based on a PW attribute obtained according to the port index of the equivalent PW.

The processes performed by BEB425 upon receiving the MAC-in-MAC encapsulated message is essentially the same as the processes performed by BEB424 described above. In particular, BEB425 de-encapsulates the received message, and searches for the source MAC address MAC-A in the corresponding MAC table of the current PBB instance. If MAC-A is not found in the MAC table, BEB425 records in the MAC table the source MAC address MAC-A and the corresponding routing information ECMP 3' and the port index PW3'-1.

BEB421, BEB424 and BEB425 examine the connection via the two respective equivalent PWs with the peer nodes BEB423 and BEB422 through sending Ethernet OAM protocol messages and CFA protocol messages.

Upon detecting that the connection via the equivalent PW PW1'-1 is broken, BEB421 checks the table entries of the MAC table that corresponds the current PBB instance, and finds none of the table entries has routing information that includes the port index of PW1'-1. Thus, BEB421 deletes from the ECMP routing group the port index of PW1'-1 from the broadcast table of the current PBB instance.

Upon detecting the connection via PW2'-1 is broken, BEB424 checks all table entries in the MAC table corresponding to the current PBB instance. When it is determined that the routing information of MAC-B includes ECMP2' and the port index of PW2'-1, BEB424 deletes the MAC-B table entry from the MAC table, and deletes from the ECMP routing group the port index of the PW2'-1 from the broadcast table of the current PBB instance.

When the user terminal A sends another message to the user terminal B, the message forwarding process is as follows:

Upon receiving a message through the AC AC1', BEB421 searches the corresponding MAC table of the current PBB instance and finds the source MAC address MAC-A and the connection AC1' that is the same as the AC at which the message arrives. BEB421 searches for the destination MAC address MAC-B in the MAC table and cannot find MAC-B, thus selects all ACs from the broadcast table of the current PBB instance apart from AC1' and broadcasts the message via the selected ACs. In addition, BEB421 computes a first hash value using a predetermined ECMP routing algorithm according to the message header, and selects, from the broadcast table out of the two equivalent PWs, the port index of PW1'-2 which corresponds to the first hash value. Using the MAC address of BEB423 connected to PW1'-2 as the outer layer destination MAC address, and the MAC address of BEB421 as the outer layer source MAC address, BEB421 encapsulates the message with a MAC-in-MAC message header, and forwards the encapsulated message via PW1'-2 to BEB423.

Upon receiving the message, BEB423 removes the MAC-in-MAC message header, searches for and cannot find the source MAC address MAC-A in the corresponding MAC table of the current PBB instance, and in response records MAC-A in the MAC table and the corresponding routing information of MAC-A, including the port index of PW1'-2. BEB423 searches for and cannot find the destination MAC address MAC-B in the MAC table, and broadcasts the message via all PWs according to the broadcast table apart from the PW at which the message was received. In particular, BEB423 encapsulates the message with a MAC-in-MAC message header using the MAC address of BEB424 connected via PW2'-2 the outer layer destination MAC address and the MAC address of BEB423 as the outer layer source MAC address, and forwards the encapsulated message via PW2'-2 to BEB424. Furthermore, BEB423 encapsulates the message with a MAC-in-MAC message header using the MAC address of BEB425 connected via PW3'-2 as the outer layer destination MAC address and the MAC address of BEB423 as the outer layer source MAC address, and forwards the encapsulated message via PW3'-2 to BEB425.

Upon receiving the MAC-in-MAC message header encapsulated message, BEB424 searches in the corresponding MAC table of the current PBB instance for the source MAC address MAC-A, and finds that the corresponding routing information to includes ECMP 2', the port index of PW2'-1. BEB424 therefore includes the port index of PW2'-2 in the routing information of MAC-A. BEB424 searches but cannot find the destination MAC address MAC-B in the MAC table, and in response selects all ACs in the broadcast table of the current PBB instance as well as all equivalent PWs having a different PW-ID to the PW-ID of the equivalent PW at which the message was received. CE412 receives the message via the AC AC2' from BEB424, and forwards the de-encapsulated message by way of unicast or broadcast to the user terminal B.

The message forwarding process performed by BEB425 upon receiving the message encapsulated in the MAC-in-MAC message header is essentially the same as the process performed by BEB424 described above. In particular, BEB425 removes the MAC-in-MAC message header, searches in the corresponding MAC table of the current PBB instance for the source MAC address MAC-A and finds the routing information includes ECMP 3' and the port index of PW3'-1, in response includes the port index of PW3'-2 in the routing information of MAC-A.

Upon detecting that the connection via PW2'-1 is broken, BEB424 checks all table entries in the MAC table corresponding to the current PBB instance. If it is found that only the port index of PW2'-1 is included in the routing information of MAC-A, BEB424 deletes the MAC-A table entry from the MAC table, and deletes, in the broadcast table, the port index of PW2'-1 from the ECMP routing group.

When the user terminal B sends a message to user terminal A, the message forwarding process is as follows:

The user terminal B sends the message to BEB424 through CE412. BEB424 searches in the corresponding MAC table of the current PBB instance and cannot find the source MAC address MAC-B, therefore records MAC-B in the MAC table and includes the access circuit AC2' between CE412 and BEB424 in the corresponding routing information. BEB424 searches in the MAC table for the destination MAC address MAC-A and finds in the corresponding routing information the ECMP-ID ECMP 2', and the port indices of PW2'-1 as well as PW2'-2. BEB424 therefore computes a second hash value using the message header and the number of equivalent PWs recorded with MAC-A. When it is determined that the obtained second hash value corresponds to the port index of PW2'-1 in the MAC table, BEB424 uses the MAC address of the peer node BEB422 connected via PW2'-1 as the outer layer destination MAC address, and the MAC address of BEB424 as the outer layer source MAC address, to encapsulate the message in a MAC-in-MAC message header, then forwards the encapsulated message via PW2'-1 to BEB422.

Upon receiving the message, BEB422 removes the message header and searches in the corresponding MAC table of the current PBB instance for the source MAC address MAC-B. When MAC-B is not found, BEB422 records MAC-B in the MAC table with the port index of PW2'-1. BEB422 searches the destination MAC address MAC-A in the MAC table and finds in the routing information of MAC-A the port index of PW1'-1. BEB422 then uses the MAC address of the peer node BEB421 connected via PW1'-1 as the outer layer destination MAC address, and the MAC address of BEB422 as the outer layer source MAC address, to encapsulate the message in a MAC-in-MAC message header, and forwards the encapsulated message via PW1'-1 to BEB421.

Upon receiving the message, BEB421 removes the MAC-in-MAC message header and searches in the corresponding MAC table of the current PBB instance for the source MAC address MAC-B. When MAC-B is not found in the MAC table, BEB421 records MAC-B in the MAC table and includes the ECMP-ID ECMP1' and the port index of PW1'-1 in the routing information. BEB421 searches for the destination MAC address MAC-A in the MAC table and finds in the routing information the access circuit AC1'. BEB421 then forward the de-encapsulated message to CE411 via AC1', and CE411 forwards the message to the user terminal A.

When the user terminal B sends another message to the user terminal A, the message forwarding process is as follows:

The user terminal B sends the message to BEB424 through CE412. BEB424 searches in the corresponding MAC table of the PBB instance for the source MAC address MAC-B, and finds in the routing information the access circuit AC2', which is the same as the access circuit AC2' at which the message arrives. BEB424 searches the destination MAC address MAC-A in the MAC table and finds in the routing information the ECMP-ID ECMP 2', and the port indices of PW2'-1 and PW2'-2. BEB424 therefore computes a second hash value using to message header and the number of equivalent PWs recorded with MAC-A, and determines that the obtained second hash value corresponds the port index of PW2'-2. BEB424 then uses the MAC address of the peer node BEB423 connected via PW2'-2 as the outer layer destination MAC address, and the MAC address of BEB424 as the outer layer source MAC address, to encapsulate the message in a MAC-in-MAC message header, and forwards the encapsulated message via PW2'-2 to BEB423.

Upon receiving the message, BEB423 searches for the user source MAC address MAC-B in the corresponding MAC table of the current PBB instance. When MAC-B is not found, BEB423 records MAC-B in the MAC table and includes in the routing information the port index of PW2'-2. BEB423 searches for the source MAC address MAC-A in the MAC table and finds in the routing information the port index of PW1'-2. BEB423 then uses the MAC address of the peer node BEB421 connected via PW1'-2 as the outer layer destination MAC address, and the MAC address of BEB423 as the outer layer source MAC address, to encapsulates the message in a MAC-in-MAC message header, and forwards the encapsulated message via PW1'-2 to BEB421.

Upon receiving the message, BEB421 removes the MAC-in-MAC message header, and searches in the corresponding MAC table of the current PBB instance for the source MAC address MAC-B. When it is found that the routing information includes the ECMP-ID ECMP 1' and the port index of PW1'-1, BEB421 includes the port index of PW1'-2 in the routing information of MAC-B. BEB421 searches for the destination MAC address MAC-A in the MAC table and finds the access circuit AC1', and forwards the de-encapsulated message via AC1' to CE411. CE411 then forwards the message to the user terminal A.

The message forwarding processes performed when a message is sent between the user terminal A and the user terminal C are essentially the same as the message forwarding processes as described above when a message is sent between the user terminal A and the user terminal B.

In BEB421, the MAC tables and the broadcast tables may also record the number of learned equivalent PWs of MAC-B and/or the number of equivalent PWs in a ECMP routing group. The method used by BEB421 to update the number of equivalent PWs for the table entry of MAC-A in the MAC table is similar to the method used by UPE321 to update the number of equivalent PWs for the table entry of MAC-A in the MAC table. The method used by BEB421 to update the number of equivalent PWs of the ECMP routing group in the broadcast table is similar to the method used by UPE321 to update the number of equivalent PWs of the ECMP routing group in the broadcast table.

Similarly, in BEB424 and BEB425, the MAC tables and the broadcast tables may also record the number of learned equivalent PWs of MAC-A and/or the number of equivalent PWs in a ECMP routing group. The method used by BEB424 and BEB425 to update the number of equivalent PWs for the table entry of MAC-B in the MAC table is similar to the method used by UPE322 to update the number of equivalent PWs for the table entry of MAC-B in the MAC table. The method used by BEB424 and BEB425 to update the number of equivalent PWs of the ECMP routing group in the broadcast table is similar to the method used by UPE322 to update the number of equivalent PWs of the ECMP routing group in the broadcast table.

Figure 5:
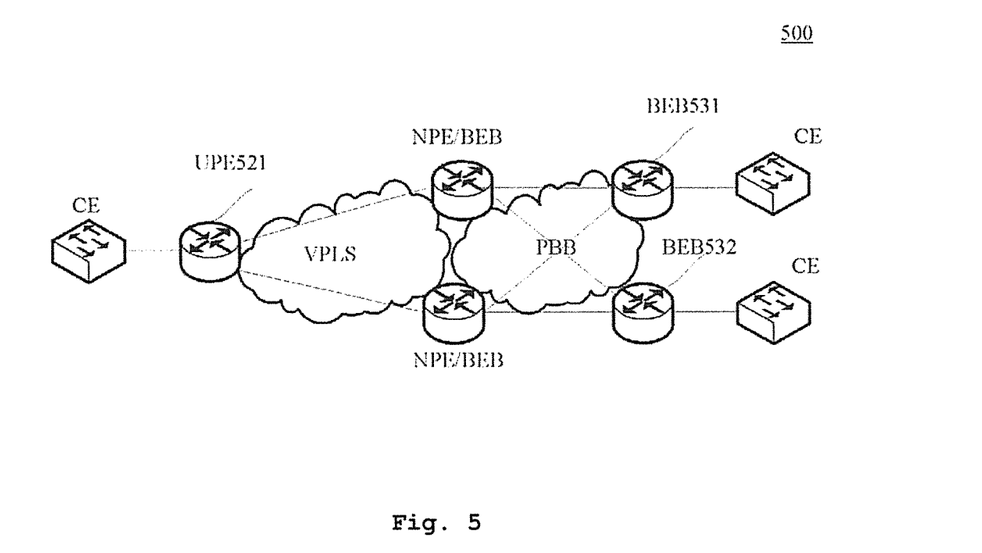
FIG. 5 is an example of a configuration of a dual-stack VPLS/PBB network.

FIG. 5 is a schematic drawing of an implementation example of a dual-stack VPLS/PBB network architecture 500. In the network 500, the device UPE521 processes and forwards a message in the same way as UPE321 in FIG. 3. The devices BEB531 and BEB532 process and forward a message in the same way as the devices BEB421, BEB424 and BEB425 in FIG. 4.

Figure 6:
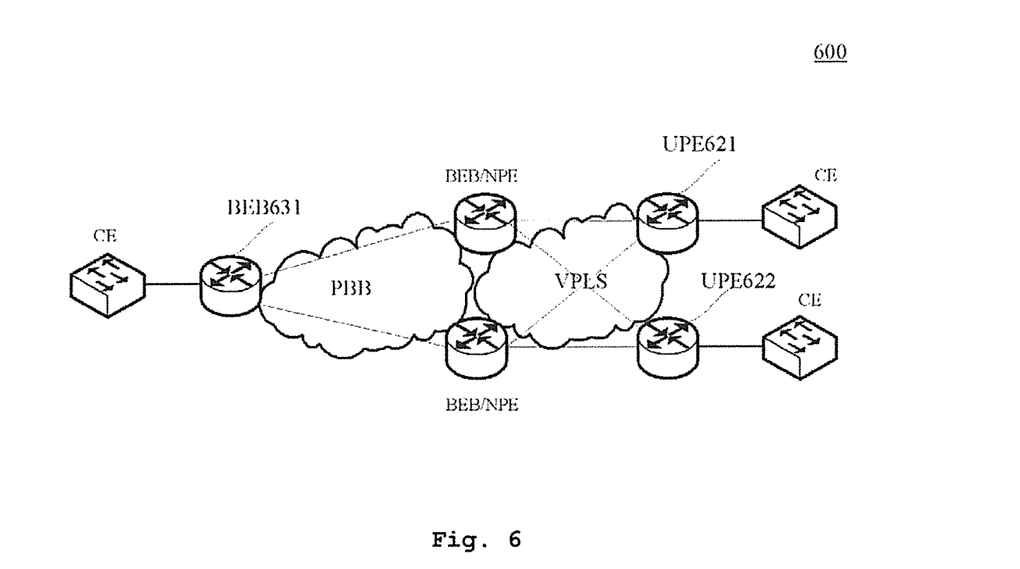
FIG. 6 is another example of a configuration of a dual-stack VPLS/PBB network.

FIG. 6 is a schematic drawing of an implementation example of another dual-stack VPLS/PBB network architecture 600. In the network 600, the devices UPE621 and UPE622 process and forward a message in the same way as the device UPE322 FIG. 3. The device BEB631 processes and forwards a message in the same way as the devices BEB421, BEB424 and BEB425 in FIG. 4.

In the dual-stack VPLS/PBB networks of FIG. 5 and FIG. 6, by connecting a CE through a BEB or a UPE to a dual-stack BEB/NPE via multiple equivalent PWs, it is possible to share user traffic amongst multiple PWs, and moreover improves the reliability of a dual-stack VPLS/PBB network. Based on the above disclosure, a person skilled in the art well may implement an L2VPN network environment using three or more equivalent PWs at each hop for forwarding and receiving messages, depending on any implementation requirements.

Figure 7:
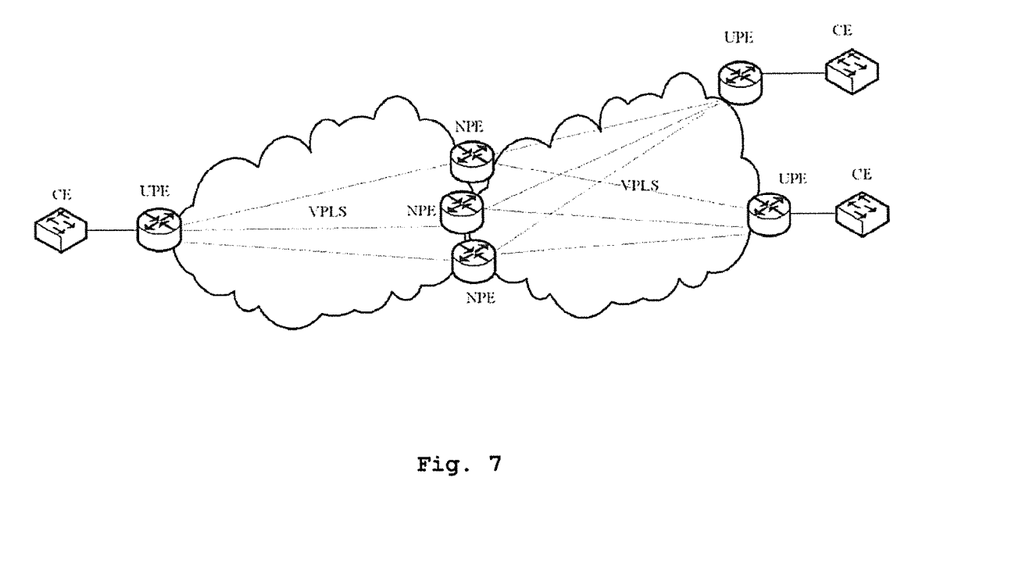
FIG. 7 is another example of a configuration of a VPLS network.

For example, as shown in the VPLS network of FIG. 7, each UPE establishes three equivalent PWs for sending and receiving messages. The source MAC address learning and message forwarding performed by each UPE are essentially the same as described above for the device UPE321 with reference to FIG. 3.

Figure 8:
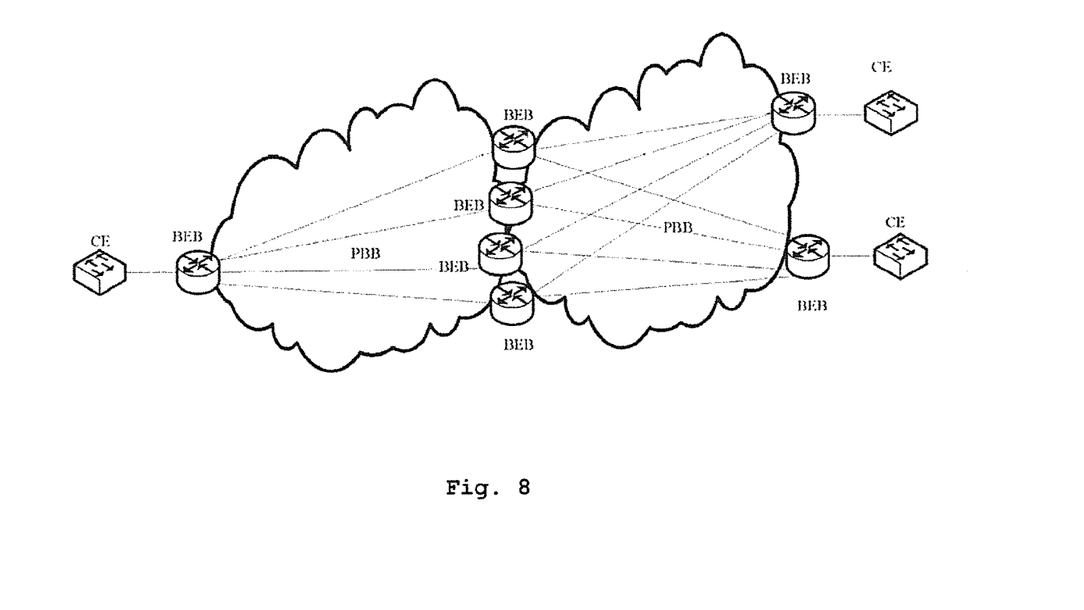
FIG. 8 is another example of a configuration of a PBB network.

In another example, as shown in the PBB network of FIG. 8, each BEB connected to a CE establishes four equivalent PWs for sending and receiving messages. The source MAC address learning and message forwarding performed by each BEB are essentially the same as described above for the device BEB421 with reference to FIG. 4.

Figure 9:
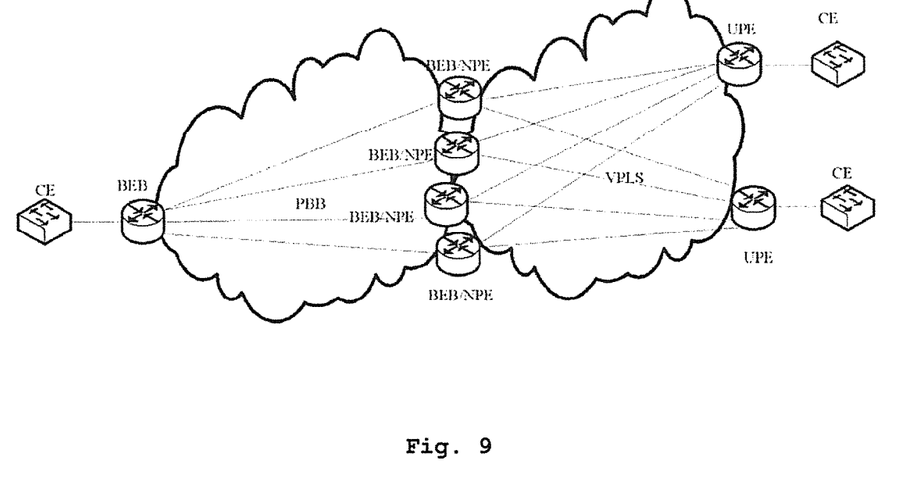
FIG. 9 is a further example of a configuration of a dual-stack VPLS/PBB network.

In a further example, as shown in the dual-stack VPLS/PBB network of FIG. 9, each UPE and each BEB connected to a CE respectively establish four equivalent PWs for sending and receiving messages. The source MAC address learning and message forwarding performed by these devices are essentially the same as described above for the devices UPE521 and BEB5315 with reference to FIG. 5.

By the above implementation example obviously, in this invention implementation example participates in the forward through many equal empty links together, shares the user current capacity, realized the load to share, when any equal empty link separation connections in many equal empty link, on other equal empty links the current capacity that avoided the equal empty link change causing lose the user current capacity automatic cut over.

It can be seen from the examples above that, through implementing a plurality of equivalent PWs in an L2VPN, network traffic may be shared amongst the plurality of equivalent PWs, thus realising load sharing. The examples as described above allow traffic to be quickly diverted to other functioning equivalent PWs in the case where one of the plurality of equivalent PWs fails.

Although the flow diagrams described above show a specific order of execution, the order of execution may differ from that which is depicted. For example, the order of execution of two or more blocks may be interchanged relative to the order shown. Also, two or more blocks shown in succession may be executed concurrently or with partial concurrence. All such variations are within the scope of the present disclosure.

The above examples can be implemented by hardware, software, firmware, or a combination thereof. For example, the various methods, processes and functional modules described herein may be implemented by a processor (the term processor is to be interpreted broadly to include a CPU, processing unit, ASIC, logic unit, or programmable gate array etc.). The processes, methods and functional modules may all be performed by a single processor or divided amongst several processors. The processes, methods and functional modules may be implemented as machine readable instructions executable by one or more processors, hardware logic circuitry of the one or more processors, or a combination thereof. Further, the teachings herein may be implemented in the form of a software product, the computer software product being stored in a storage medium and comprising a plurality of instructions for making a computer device (e.g. a personal computer, a server or a network device such as a router, switch, access point etc.) implement the method recited in the examples of the present disclosure.

It should be understood that embodiments of the method for transmitting a message in a Hierarchical Layer 2 Virtual Private Network, and embodiments of the network device given above are implementation examples only, and do not limit the scope of the invention. Numerous other changes, substitutions, variations, alternations and modifications may be ascertained by those skilled in the art, and it is intended that the present disclosure encompass all such changes, substitutions, variations, alterations and modifications as falling within the spirit and scope of the appended claims.

The invention claimed is:

1. A method for transmitting a message in a Hierarchical Layer 2 Virtual Private Network (H-L2VPN) comprising:
   a first peer node of the network determining a destination MAC address to which a message is to be forwarded upon receiving the message;
   determining whether the destination MAC address is present in a MAC table maintained by the first peer node;
   in response to a determination that the destination MAC address is not present in the MAC table, the first peer node selecting a pseudo-wire (PW) from a plurality of PWs connected to the destination MAC address and broadcasting the message to the network via the selected PW;
   in response to a determination that the destination MAC address is present in the MAC table, the first peer node obtaining a hash value of the message, selecting a PW from the plurality of PWs based on the obtained hash value of the message, and sending the message to the destination MAC address via the selected PW;
   the first peer node determining whether a source MAC address from which the message is received is in a MAC table maintained by the first peer node; and
   in response to a determination that the source MAC address is not in the MAC table, the first peer node learning a path along which the message is received from the source MAC address and recording in the MAC table the source MAC address together with the learned path as routing information of the source MAC address.

2. The method of claim 1, wherein the first peer node determines that more than one equivalent PW form a path to the destination MAC address when the first peer node determines that the destination MAC address is in the MAC table and the corresponding routing information includes more than one path.

3. The method of claim 1, wherein, in response to the determination that the destination MAC address is not present in the MAC table, the first peer node selecting one of the plurality of PWs by obtaining a hash value of the message and selecting one of the plurality of PWs based on the hash value of the message.

4. The method of claim 1, wherein the method further comprises:
   the first peer node determining, when an equivalent PW is down, whether the down equivalent PW is included in one or more paths recorded in corresponding routing information of any previously learned MAC address recorded in the MAC table; and
   the first peer node deleting, when the first peer node determines that the down equivalent PW is included in one or more paths recorded in the corresponding routing information of one or more previously learned MAC addresses, the one or more paths from the corresponding routing information of the one or more previously learned MAC addresses.

5. The method of claim 1, wherein the method further comprises:
   the first peer node determining, when an equivalent PW is down, whether the down equivalent PW is included in one or more paths recorded in corresponding routing information of any previously learned MAC address recorded in the MAC table; and the first peer node deleting, when the first peer node determines that the corresponding routing information of a previously learned MAC address includes only a path or paths that include the down equivalent PW, the previously learned MAC address and the corresponding routing information from the MAC table.

6. The method of claim 1, wherein a second peer node corresponding to the selected PW maintains a table for recording each previously learned MAC address with corresponding routing information, the route information including one or more paths connecting the second peer node to the previously learned MAC address, the method further comprises:

the second peer node receiving the message from the first peer node via the selected PW;

the second peer node determining a source MAC address from which the message is received and determining whether the source MAC address is in the table; and the second peer node learning, when the second peer node determines that the source MAC address is not in the table, the path along which the message is received from the source MAC address and recording in the table the source MAC address together with the learned path as the corresponding routing information of the source MAC address.

7. A network device for transmitting a message in a Hierarchical Layer 2 Virtual Private Network (H-L2VPN), wherein the network device is to be connected in the H-L2VPN to other network devices of the H-L2VPN via respective equivalent pseudo wires (PWs), said network device comprising:

a memory to store a MAC table containing previously learned MAC addresses; and a processor to execute machine readable instructions in the memory to:

determine a destination MAC address to which a message is to be forwarded upon receiving the message;

determine whether the destination MAC address is present in the MAC table;

in response to a determination that the destination MAC address is not present in the MAC table, select one of a plurality of equivalent PWs and broadcast the message to the network via the selected equivalent PW;

in response to a determination that the destination MAC address is present in the MAC table, obtain a hash value of the message based on a field in the message, select an equivalent PW from a plurality of equivalent PWs connected to the destination MAC address based on the obtained hash value of the message, and forward the message via the selected equivalent PW to the destination MAC address;

determine whether a source MAC address from which the message is received is in the MAC table; and in response to a determination that the source MAC address is not in the MAC table, learn a path along which the message is received from the source MAC address and record in the MAC table the source MAC address together with the learned path as routing information of the source MAC address.

8. The network device of claim 7, wherein the MAC table contains previously learned MAC addresses with corresponding routing information, the routing information including one or more paths connecting the network device to the previously learned MAC addresses, wherein the processor determines whether one or more equivalent PWs connect to the destination MAC address by determining whether the destination MAC address is in the MAC table.

9. The network device of claim 7, wherein, when an equivalent PW is down, the processor is to:

determine whether the down equivalent PW is included in one or more paths recorded in corresponding routing information of any previously learned MAC address recorded in the MAC table; and delete, in response to a determination that the down equivalent PW is included in one or more paths recorded in the corresponding routing information of one or more previously learned MAC addresses, the one or more paths from the corresponding routing information of the one or more previously learned MAC addresses in the MAC table.

10. The network device of claim 7, wherein, when an equivalent PW is down, the processor is to:

determine whether the down equivalent PW is included in one or more paths recorded in corresponding routing information of any previously learned MAC address recorded in the MAC table; and delete, in response to a determination that the corresponding routing information of a previously learned MAC address includes only a path or paths that include the down equivalent PW, the previously learned MAC address and the corresponding routing information from the MAC table in the memory.

11. A non-transitory computer readable storage medium storing machine readable instructions, which when executed by a processor cause the processor to:

determine a destination MAC address to which a message is to be forwarded;

determine whether the destination MAC address is present in a MAC table;

in response to a determination that the destination MAC address is not present in the MAC table, select one of a plurality of pseudo wires (PWs) and broadcast the message to a network via the selected PW;

in response to a determination that the destination MAC address is present in the MAC table, obtain a hash value of the message, select one of the plurality of PWs based on the hash value, and send the message via the selected PW to the destination MAC address;

determine whether a source MAC address from which the message is received is in the MAC table; and in response to a determination that the source MAC address is not in the MAC table, learning a path along which the message is received from the source MAC address and record in the MAC table the source MAC address together with the learned path as routing information of the source MAC address.

12. The non-transitory computer readable storage medium of claim 11, wherein, in response to a determination that an equivalent PW is down, the machine readable instructions cause the processor to:

determine whether the down equivalent PW is included in one or more paths recorded in routing information of any previously learned MAC address recorded in the MAC table; and in response to a determination that the down equivalent PW is included in one or more paths recorded in the routing information of one or more previously learned MAC addresses, delete the one or more paths from the routing information of the one or more previously learned MAC addresses.

13. The non-transitory computer readable storage medium of claim 11, wherein, in response to a determination that an equivalent PW is down, the machine readable instructions cause the processor to:
  determine whether the down equivalent PW is included in one or more paths recorded in routing information of any previously learned MAC address recorded in the MAC table; and
  in response to a determination that the down equivalent PW is included in one or more paths recorded in the routing information of one or more previously learned MAC addresses, delete the previously learned MAC address and the routing information from the MAC table.

* * * * *